(12) United States Patent
Rogan et al.

(10) Patent No.: US 9,905,032 B2
(45) Date of Patent: *Feb. 27, 2018

(54) OBJECT REMOVAL USING LIDAR-BASED CLASSIFICATION

(71) Applicant: MICROSOFT TECHNOLOGY LICENSING, LLC, Redmond, WA (US)

(72) Inventors: Aaron Matthew Rogan, Westminster, CO (US); Benjamin James Kadlec, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,153

(22) Filed: Dec. 19, 2016

(65) Prior Publication Data

US 2017/0098323 A1    Apr. 6, 2017

Related U.S. Application Data

(63) Continuation of application No. 13/918,159, filed on Jun. 14, 2013, now Pat. No. 9,523,772.

(51) Int. Cl.
*G06T 11/60*    (2006.01)
*G01S 17/50*    (2006.01)
(Continued)

(52) U.S. Cl.
CPC .............. *G06T 11/60* (2013.01); *G01S 17/50* (2013.01); *G01S 17/89* (2013.01); *G01S 17/936* (2013.01);
(Continued)

(58) Field of Classification Search
None
See application file for complete search history.

(56) References Cited

U.S. PATENT DOCUMENTS

| 8,244,026 B2 | 8/2012 | Nahari et al. |
| 8,269,652 B2 | 9/2012 | Seder |

(Continued)

FOREIGN PATENT DOCUMENTS

| CA | 2678156 | 8/2008 |
| CN | 101702200 | 5/2010 |

(Continued)

OTHER PUBLICATIONS

Oszkar Jozsa, Attila Bores and Csaba Benedek, "Toward 4D virtual city reconstruction" May 28, 2013, IS PRS Annals of the Photogrammetry, Remote Sensing and Spatial Information Sciences.*

(Continued)

*Primary Examiner* — Mark Zimmerman
*Assistant Examiner* — Yu-Jang Tswei

(57) ABSTRACT

In scenarios involving the capturing of an environment, it may be desirable to remove temporary objects (e.g., vehicles depicted in captured images of a street) in furtherance of individual privacy and/or an unobstructed rendering of the environment. However, techniques involving the evaluation of visual images to identify and remove objects may be imprecise, e.g., failing to identify and remove some objects while incorrectly omitting portions of the images that do not depict such objects. However, such capturing scenarios often involve capturing a lidar point cloud, which may identify the presence and shapes of objects with higher precision. The lidar data may also enable a movement classification of respective objects differentiating moving and stationary objects, which may facilitate an accurate removal of the objects from the rendering of the environment (e.g., identifying the object in a first image may guide the identification of the object in sequentially adjacent images).

20 Claims, 10 Drawing Sheets

(51) Int. Cl.
  *G01S 17/89* (2006.01)
  *G01S 17/93* (2006.01)
  *G06K 9/46* (2006.01)
  *G06K 9/00* (2006.01)
  *G01S 17/00* (2006.01)
  *G06T 19/20* (2011.01)
  *G01S 7/48* (2006.01)

(52) U.S. Cl.
  CPC .......... *G06K 9/4671* (2013.01); *G01S 7/4808* (2013.01); *G01S 17/00* (2013.01); *G06K 9/00* (2013.01); *G06K 9/00201* (2013.01); *G06K 9/00335* (2013.01); *G06T 19/20* (2013.01)

(56) References Cited

U.S. PATENT DOCUMENTS

| | | | |
|---|---|---|---|
| 8,332,134 | B2 | 12/2012 | Zhang |
| 8,798,372 | B1 | 8/2014 | Korchev et al. |
| 8,977,007 | B1* | 3/2015 | Ferguson ............ G06K 9/00825 340/988 |
| 9,110,163 | B2 | 8/2015 | Rogan |
| 9,523,772 | B2 | 12/2016 | Rogan et al. |
| 2002/0035444 | A1 | 3/2002 | Wilkerson et al. |
| 2005/0075811 | A1 | 4/2005 | Lafitte et al. |
| 2005/0129324 | A1* | 6/2005 | Lemke .................. H04N 1/387 382/254 |
| 2008/0018646 | A1 | 1/2008 | Farag et al. |
| 2009/0175527 | A1 | 7/2009 | Agliozzo et al. |
| 2009/0231327 | A1 | 9/2009 | Minear et al. |
| 2010/0053593 | A1 | 3/2010 | Bedros et al. |
| 2010/0188504 | A1 | 7/2010 | Dimsdale et al. |
| 2010/0204964 | A1 | 8/2010 | Pack et al. |
| 2011/0123068 | A1* | 5/2011 | Miksa ..................... G06T 5/002 382/105 |
| 2011/0224844 | A1 | 9/2011 | Farwell et al. |
| 2012/0162253 | A1* | 6/2012 | Collins ..................... G06T 9/00 345/629 |
| 2012/0186774 | A1 | 7/2012 | Matsuoka et al. |
| 2012/0294532 | A1 | 11/2012 | Morris |
| 2013/0051655 | A1 | 2/2013 | Collard et al. |
| 2013/0120371 | A1* | 5/2013 | Petit ........................ H04L 67/38 345/419 |
| 2013/0170557 | A1 | 7/2013 | Wang et al. |
| 2013/0265189 | A1 | 10/2013 | Chang et al. |
| 2014/0002439 | A1* | 1/2014 | Lynch .................. G09B 29/007 345/419 |
| 2014/0368493 | A1 | 12/2014 | Rogan et al. |
| 2014/0368807 | A1 | 12/2014 | Rogan |
| 2016/0162742 | A1 | 6/2016 | Rogan |

FOREIGN PATENT DOCUMENTS

| | | |
|---|---|---|
| CN | 102103202 | 6/2011 |
| JP | 2008-309533 | 12/2008 |
| JP | 2009-258058 | 11/2009 |
| WO | WO 2010/042466 | 4/2010 |
| WO | WO 2011/153624 | 12/2011 |
| WO | WO 2013/076829 | 5/2013 |

OTHER PUBLICATIONS

Kenji Omasa, Fumiki Hosoi and Atsumi Konishi, "3D lidar imaging for detecting and understanding plant responses", Oct. 9, 2006, Journal of Experimental Botany.*

"Dense Structure Inference for Object Classification in Aerial LIDAR Dataset", Eunyoung Kim and Gerard Medioni, Aug. 23, 2010, Proceedings: In International Confernce on Pattern Recognition, 4 pgs.

"Increasing Interactivity in Street View Web Navigation Systems", Alexandre Devaux and Nicolas Paparoditis, Oct. 25, 2009, Proceedings: In Proceedings of the International Conference on Multimedia, 4 pgs.

"Large-scale Privacy Protection in Google Street View", Andrea Frome, German Cheung, Ahmad, Abdulkader, Marco Zennaro, Bo Wu, Allessandro Bissacco, Hartwig Adam, Hartmut Nevea and Luc Vincent, Nov. 29, 2009, Proceedings: In IEEE 12th International Conference on Computer Vision, 8 pgs.

"Real-Time Object Classification in 3D Point Clouds Using Point Feature Histograms", m. Himmelsbach, T. Luetiel and H.-J. Wuensche, Oct. 11-15, 2009, The 2009 IEEE/RSJ International Conference on Intelligent Robots and Systems, pp. 994-1000.

"Rule-based Improvement of Maximum Likelihood Classified LIDAR Data fused with co-registered Bands", Marc Bartels and Hong Wei, Sep. 5, 2006, Proceedings: In Annual Conference of the Remote Sensing and Photogrammetry Society, 9 pgs.

"Semantic Classification in Aerial Imagery by Integrating Appearance and Height Information", Stefan Kluckner, Thomas Mauthner, Peter M. Roth and Horst Bischof, Sep. 23, 2009, Proceedings: In Proceedings of the 9th Asian Conference on Computer Vision, vol. Part 11, pp. 477-488.

"Survey of Clustering Algorithms", Rui Xu and Donald Wunsch 11, May 3, 2005, IEEE Transactions on Neural Networks, vol. 16, No. 3, pp. 645-678.

"Towards 4D Virtual City Reconstruction from Lidar Point Cloud Sequences", Oszkar Juzas, Atiila Borcs and Csaba Benedek, May 28, 2013, ISPRS Annals of the Photogrammetry, Remote Sensing and Spatial Information Sciences, vol. 11-3/W1. 2013. VCM 2013, The ISPRS Workshop on 3D Virtual City Modeling, pp. 15-20.

Bartels, et al., "Analysis of LIDAR Data Fused with Co-Registered Bands"—Published Date: Nov. 22, 2006, Proceedings: In Proceedings of the IEEE International Conference on Video and Signal Based Surveillance, pp. 6, http://citeseerx.ist.psu.edu/viewdoc/download?doi=10.1.1.218.6748&rep=rep1 &type=pdf.

Chang, et al., "Automatic Classification of LIDAR Data into Ground and Nonground Points"—Published Date: Jul. 3, 2008, Proceedings: In the International Archives of the Photogrammetry, Remote Sensing and Spatial Information Sciences, pp. 6, http://www.isprs.org/proceedings/XXXVII/congress/4_pdf/81.pdf.

PCT Int. Search Report cited in PCT Application No. PCT/US2014/041827 dated Sep. 15, 2014, 12 pgs.

Notice of Allowance cited in U.S. Appl. No. 13/917,821 dated Nov. 14, 2014, 22 pgs.

Pre-Interview Office Action cited in U.S. Appl. No. 13/917,821 dated Jun. 5, 2014, 14 pgs.

Premebida, et al., "A Lidar and Vision-based Approach for Pedestrian and Vehicle Detection and Tracking"—Published Date: Sep. 30, 2007, Proceedings: In IEEE Intelligent Transportation Systems Conference, pp. 7 http://www2.isr.uc.pU-cpremebida/files_cp/A%20Lidar%20and%20Vision-based%20Approach%20for%20Pedestrian%20and%20Vehicle%20Detection%20and%20Tracking.pdf.

Reply Pre-Interview Office Action cited in U.S. Appl. No. 13/917,821 dated Aug. 5, 2014, 8 pgs.

Shackleton, et al., "Tracking People with a 360-Degree Lidar"—Published Date: Aug. 29, 2010, Proceedings: In Proceedings of the 7th IEEE International Conference on Advanced Video and Signal Based Surveillance, pp. 7, http://www-users.cs.umn.edu/-joel/_files/Joel_Hesch_AVSS10.pdf.

Wang, et al., "A Method for Detecting Windows from Mobile LiDAR Data"—Published Date: Jan. 5, 2011, Proceedings: In Proceedings of the IEEE Workshop on Applications of Computer Vision, pp. 31, http://www.ucalgary.ca/rswang/files/rswang/WindowDetectionfromMobileLiDARData_accepted.pdf.

U.S. Appl. No. 13/917,821, Notice of Allowance dated Apr. 10, 2015, 13 pgs.

U.S. Appl. No. 13/918,159, Preinterview 1st Office Action dated Jul. 20, 2015, 5 pgs.

U.S. Appl. No. 13/918,159, Proposed Amendments filed Sep. 21, 2015, 8 pgs.

U.S. Appl. No. 13/918,159, Office Action and Interview dated Oct. 23, 2015, 5 pgs.

U.S. Appl. No. 13/918,159, Amendment and Response filed Dec. 23, 2015, 18 pgs.

U.S. Appl. No. 13/918,159, Notice of Allowance dated May 11, 2016, 7 pgs.

(56) References Cited

OTHER PUBLICATIONS

U.S. Appl. No. 13/918,159, Notice of Allowance dated May 20, 2016, 5 pgs.
U.S. Appl. No. 13/918,159, Notice of Allowance dated Aug. 1, 2016, 7 pgs.
U.S. Appl. No. 13/918,159, Amendment after Allowance filed Nov. 1, 2016, 8 pgs.
U.S. Appl. No. 14/798,944, Office Action dated Sep. 9, 2016, 7 pgs.
Himmelsbach, et al., "Real-Time Object Classification in 3d Point Clouds Using Point Feature Histograms", In IEEE/ RSJ International Conference on Intelligent Robots and Systems, Oct. 10, 2009, 7 Pages.
Jozsa, et al., "Towards 40 Virtual City Reconstruction From Lidar Point Cloud Sequences", In ISPRS Annals of Photogrammetry, Remote Sensing and Spatial Information Sciences, vol. 1 I-3/W1, May 28, 2013, pp. 15-20.
U.S. Appl. No. 14/798,944, Amendment and Response filed Jan. 12, 2017, 9 pgs.
U.S. Appl. No. 14/798,944, Notice of Allowance dated Feb. 7, 2017, 5 pgs.
U.S. Appl. No. 14/798,944, Office Action dated May 31, 2017, 6 pgs.
Australian First Exam Report in Application 201427879, dated Nov. 11, 2016, 2 pgs.
Chinese 1st Office Action in Application 201480041168.5, dated Apr. 1, 2017, 8 pgs.
Japanese Office Action in Application 2016-519601, dated Jan. 17, 2017, 4 pages.

\* cited by examiner

OBJECT REMOVAL USING LIDAR-BASED CLASSIFICATION

CROSS-REFERENCE TO RELATED APPLICATIONS

This application is a continuation of U.S. Appl. Ser. No. 13/918,159, now U.S. Pat. No. 9,523,772, filed Feb. Jun. 14, 2013, titled "Object Removal Using Lidar-Based Classification", which is incorporated herein by reference. To the extent appropriate, a claim or priority is made to the above-recited application.

BACKGROUND

Within the field of computing, many scenarios involve the capturing and rendering of a representation of an environment, such as a portion of a street, the interior of a room, or a clearing in a natural setting. As a first example, a set of images may be captured by a spherical lens camera and stitched together to form a visual rendering. As a second example, the geometry of objects within the environment may be detected and evaluated in order to render a three-dimensional reconstruction of the environment.

In these and other scenarios, the portions of the capturing of the environment may be occluded by objects that are present within the environment. For example, a capturing of a set of images depicting the setting and buildings along a street may be occluded by objects such as vehicles, pedestrians, animals, and street signs. While such objects may be present in the scene in a static or transient manner, it may be undesirable to present such objects as part of the scene. Therefore, in such scenarios, image processing techniques may be utilized to detect the portions of the respective images depicting such objects and to remove such objects from the rendering of the environment. For example, image recognition techniques may be applied to the respective images to identify the presence and location of depicted objects such as vehicles and people (e.g., based on a visual estimation of the size, shape, and color of the objects, utilizing imaging properties such as scale, shadowing, and parallax), and to refrain from including those portions of the images in the rendering of the environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the removal of occluding objects from a rendering of an environment may be desirable, it may be difficult to achieve the removal through image processing techniques, due to the limitations in the precision of image processing techniques. For example, automated image techniques for identifying the presence of individuals in an image may be skewed by properties such as visual distortion, glare, and shadows, and may therefore result in false negatives (e.g., failing to identify a present individual, and rendering the depiction of part or all of the individual into the scene) and/or false positives (e.g., incorrectly identifying a portion of an image as depicting an individual, and therefore removing the individual from the image).

However, in some scenarios, laser imaging ("lidar") data may be accessible that provides a supplementary set of information about the objects present in an environment. For example, some image capturing vehicles are also equipped with a lidar emitter that emits a low-powered, visible-spectrum laser at a specific wavelength, and a lidar detector that detects light at the specific wavelength representing a reflection off of nearby objects. The resulting "lidar point cloud" is often utilized, e.g., for navigation and/or calibration of the vehicle and cameras. However, lidar data may also be capable of identifying the objects present in the environment, and, more specifically, classifying the respective objects according to a movement classification (e.g., moving, foreground stationary, background stationary, and fixed-ground stationary). These types of object identification and movement classification may guide the omission of the objects from the rendering of the environment. For example, identifying an object in a first image of an environment, using the lidar data and movement classification, may facilitate the identification of the same object in sequentially adjacent images in an image sequence of the environment (e.g., images chronologically preceding and following the first image).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
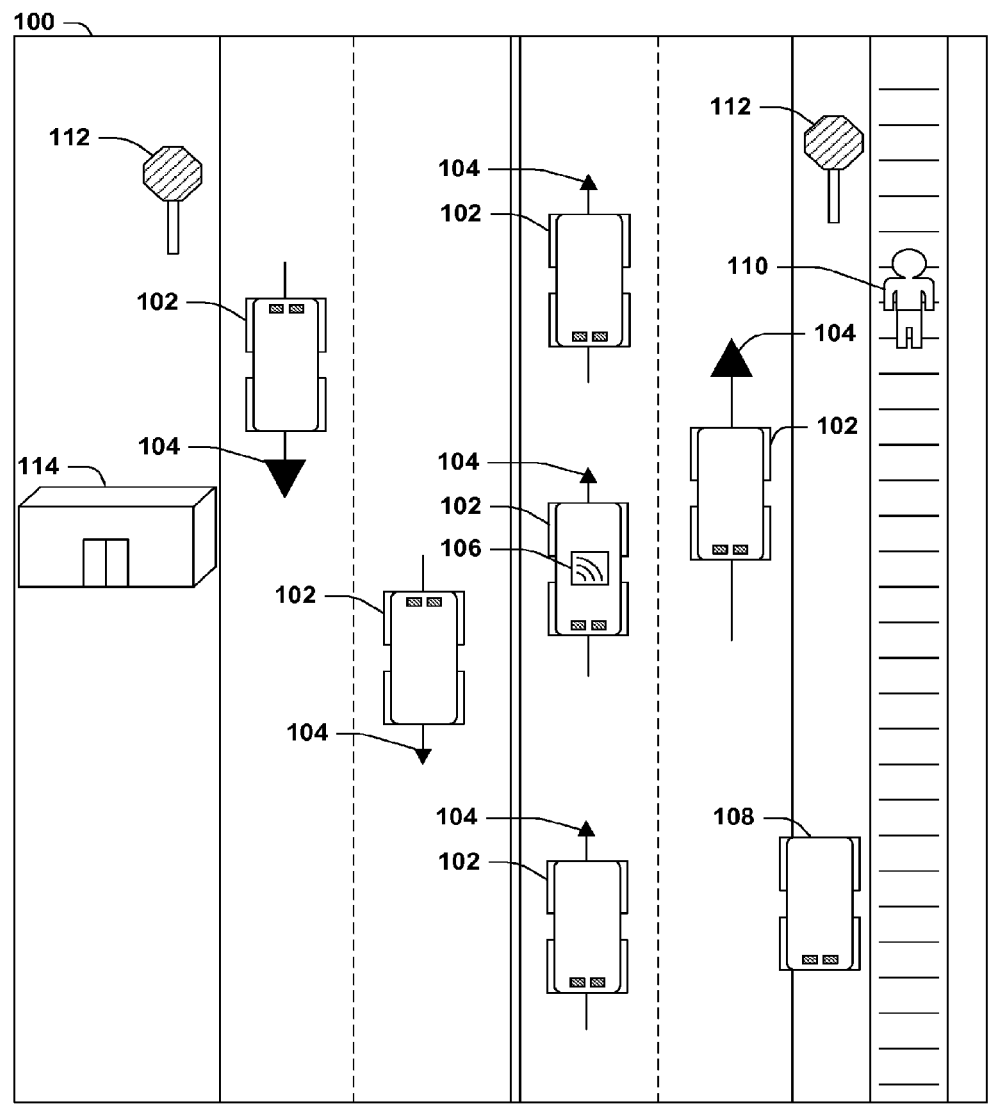
FIG. 1 is an illustration of an exemplary scenario featuring a vehicle moving within an environment while capturing images of the environment and other objects present in the environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of machine vision, many scenarios involve an automated evaluation of images of an environment to detect the objects present in the environment and depicted in the images, and, more particularly, to identify the position, size, orientation, velocity, and/or acceleration of the objects. As a first example, the evaluation may involve vehicles in a transit environment, including automobiles, bicycles, and pedestrians in a roadway as well as signs, trees, and buildings, in order to facilitate obstacle avoidance. As a second example, a physical object tracking system may evaluate the motion of an object within an environment in order to interact with it (e.g., to catch a ball or other thrown object). As a third example, a human actor present in a motion-capture environment may be recorded while performing various actions in order to render animated personalities with human-like movement. In various scenarios, the analysis may be performed in realtime or near-realtime (e.g., to facilitate a device or individual in interacting with the other present objects), while in other scenarios, the analysis may be performed retrospectively (e.g., to identify the movement of objects that were present at the time of the capturing). These and other scenarios often involve the capturing and evaluation of a set of visible light images, e.g., with a still or motion camera, and the application of visual processing techniques to human-viewable images. For example, machine vision techniques may attempt to evaluate, from the contents of the image, the type, color, size, shape, orientation, position, speed, and acceleration of an object based on visual cues such as shadowing from light sources, perspective, relative sizes, and parallax effects.

FIG. 1 presents an illustration of an exemplary scenario featuring a set of objects 102 comprising vehicles operating in an environment 100 (e.g., with a particular motion vector 104 while operating a camera 106 to capture a sequence of images of the environment 100. In this exemplary scenario, other objects 102 are also present in the environment 100, and may involve both objects 102 having a motion vector 104 and stationary vehicles 108, such as parked cars. The environment 100 may also include other types of moving objects, such as individuals 110, as well as various stationary objects, such as signs 112 and buildings 114. Within such scenarios, a reconstruction of the environment 100 may later be performed. As a first example, a set of orthogonal, panoramic, and/or spherical images captured by the camera 106 may be stitched together to form a three-dimensional image reconstruction of the view of the environment 100 from the perspective of the vehicle. As a second example, a detection of the position, size, and shape of the objects 102 in the environment 100 may enable a three-dimensional geometric reconstruction of the environment 100.

In these and other scenarios, it may be desirable to remove part or all of the objects detected in the environment 100. As a first example, the objects 102 may be associated with individuals, and it may be desirable to remove identifying indicators of the individuals who were present when the environment 100 was captured (e.g., by removing an entire object 102 present in the environment 100, such as a depiction of an individual 110, and/or by removing only a personally identifying portion of an object 102, such as the face of the individual 110 or a license plate of a vehicle). As a second example, it may be desirable to generate a rendering of the environment 100 that is not obscured by the objects 102 temporarily present in the environment 100 at the time of capturing. As a third example, it may be desirable to depict the movement of the detected objects 102 within the environment 100, which may involve generating a static three-dimensional reconstruction of the environment 100 omitting all of the objects 102, and then to add animation of the objects 102 through the environment 100 and/or to generate a more accurate three-dimensional model of the moving objects for various applications, including sharpened visualization, further classification of the object (e.g., identifying the make and model of a moving vehicle), and movement tracking.

However, in these scenarios, the achievable precision in the identification of the movement of the objects from an inspection of visual images may be limited. For example, techniques such as perspective and parallax may provide only general estimates, particularly for objects that are distant from the camera lens, and/or may be distorted by visual artifacts, such as glare and shadows. As a result, such evaluative techniques may produce estimates with low precision and/or a high degree of error, and may be inadequate for particular uses. As a first example, the image processing techniques may fail to recognize some objects 102 or portions thereof (i.e., false negatives), and may therefore fail to omit the objects 102 from the rendering of the environment 100. As a second example, the image processing techniques may incorrectly identify a portion of an image as depicting an individual 110 (i.e., false positives), and may omit portions of the rendering of the environment 100 that are not associated with objects 102. For example, a visual image may capture a billboard depiction of a vehicle, or a stone sculpture of an individual. Image processing techniques may incorrectly identify these portions of the environment 100 as depicting actual vehicles or individuals 110, and may remove them from an image-based rendering of the environment 100, thus removing valuable information about the environment 100 in the absence of a significant motivation of privacy preservation and/or removal of obscuring objects 102 within the environment 100 (i.e., it may be desirable to include these objects 102 as significant features of the environment 100).

B. Presented Techniques

Many scenarios involving the evaluation of object movement may be achieved through devices (such as objects 102) that also have access to data from a laser imaging ("lidar") capturing device, which may emit a set of focused, low-power beams of light of a specified wavelength, and may detect and record the reflection of such wavelengths of light from various objects. The detected lidar data may be used to generate a lidar point cloud, representing the lidar points of light reflected from the object and returning to the detector, thus indicating specific points of the objects present in the environment 100. By capturing and evaluating lidar data over time, such a device may build up a representation of the relative positions of objects around the lidar detector (e.g., the locations of other objects 102 with respect to the object 102 operating the camera 106). These representations may be used while generating reconstructions of the environment 100 to omit the depictions of the objects 102.

Figure 2:
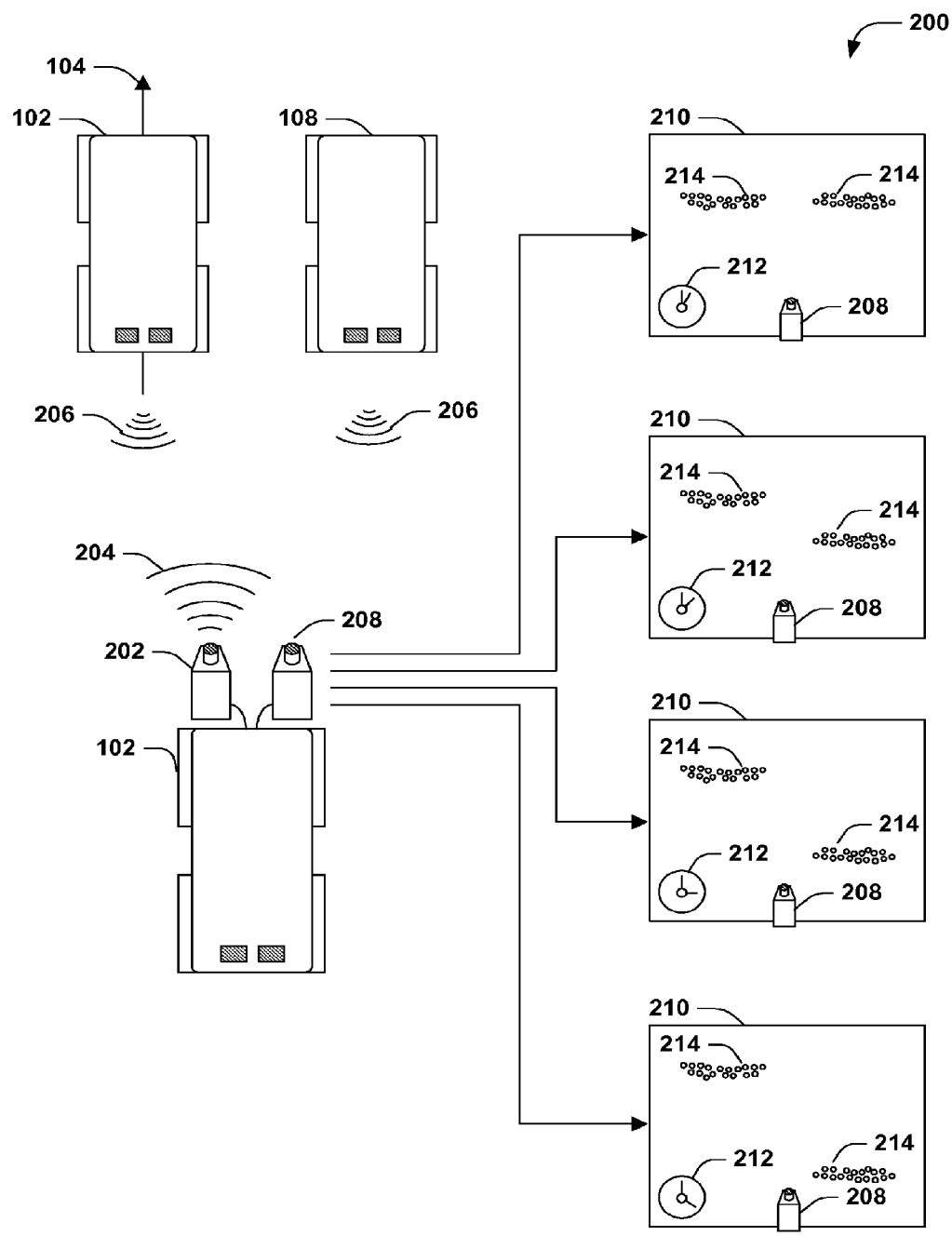
FIG. 2 is an illustration of an exemplary scenario featuring a capturing of a lidar point cloud of an environment around a vehicle and depicting the other objects present within the environment.

FIG. 2 presents an illustration of an exemplary scenario 200 featuring one such technique for capturing an environment 100 including a set of objects 102 (e.g., vehicles) using a lidar point cloud. In this exemplary scenario 200, a first object 102 is positioned behind a moving object 102 having a motion vector 104, and a stationary vehicle 108 having no detectable motion. The first object 102 may comprise a lidar emitter 202 that emits a lidar signal 204 ahead of the first object 102. The lidar reflection 206 of the lidar signal 204 may be detected by a lidar detector 208, and captured as a sequence of lidar point clouds 210 representing, at respective time points 212, the lidar points 214 detected by the lidar detector 208 within the environment 100. In particular, the detected lidar points 214 may cluster around particular objects (such as objects 102), which may enable the lidar detector 208 to identify the presence, size, and/or range of the objects at respective time points 212. Additionally, by comparing the ranges of the objects 102 or other objects over time, the lidar detector 208 may determine an approximate velocity of the objects. For example, when comparing the lidar point clouds 210 over time, the lidar points 214 representing the moving object 102 and the lidar points 214 representing the stationary vehicle 108 may move with respect to each other and the first object 102. However, if the object 102 carrying the lidar detector 208 is also moving, the approximate velocities of the objects 102 or other objects represented by the lidar points 214 in the lidar point cloud 210 may be distorted; e.g., stationary vehicles 108 may appear to be moving, while moving objects 102 that are moving at an approximately equivalent velocity and direction as the object 102 carrying the lidar detector 208 may appear as stationary vehicles 108. Such complications may be come exacerbated if the objects are detected as moving in three-dimensional space as well as over time, and/or if the orientation of the object 102 carrying the lidar detector 208 also changes (e.g., accelerating, decelerating, and/or turning). Even determining whether respective objects (such as objects 102) are moving or stationary may become difficult in view of these factors.

Figure 3:
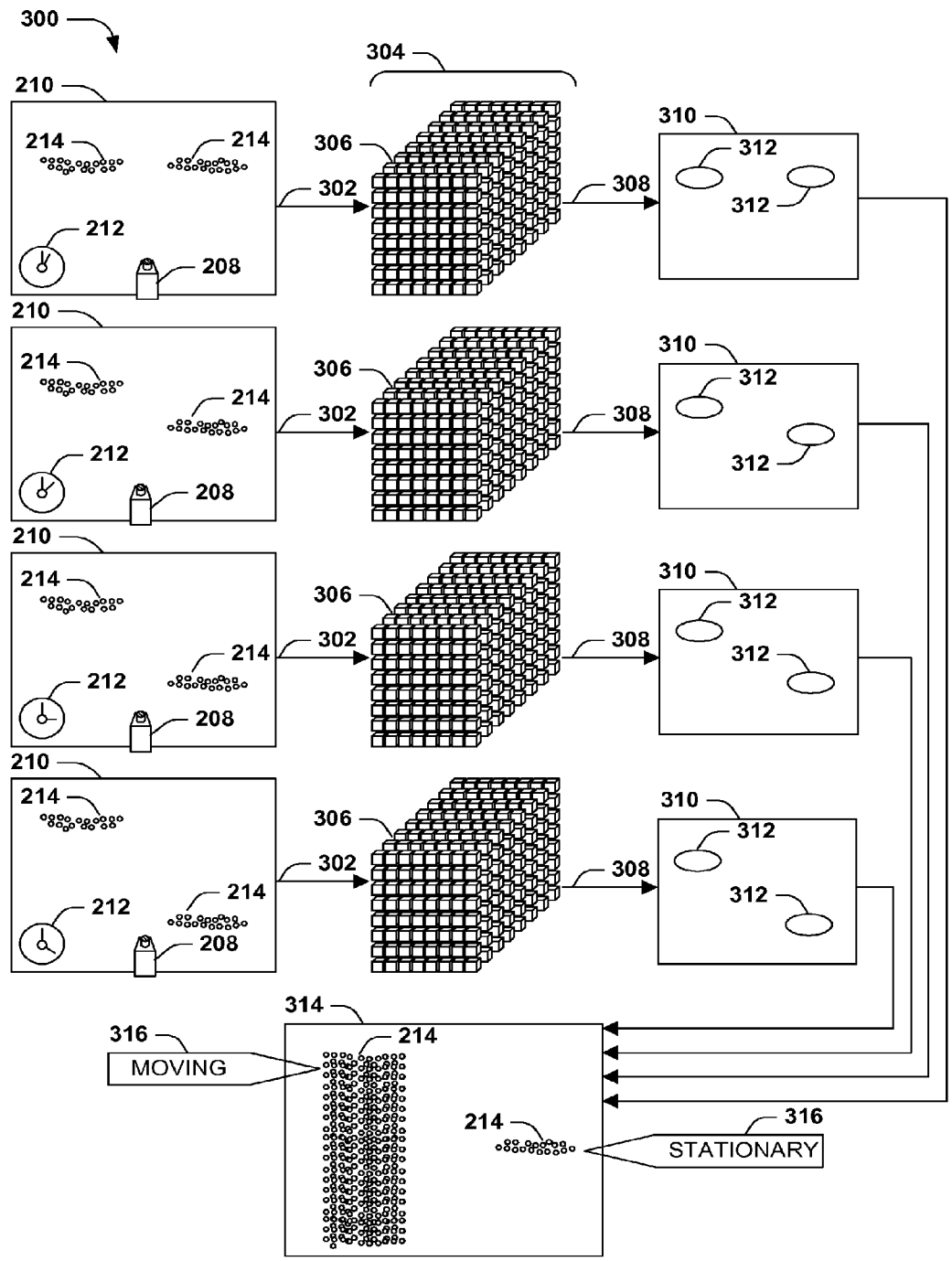
FIG. 3 is an illustration of an exemplary scenario featuring an evaluation of a lidar point cloud over time to classify identified objects as stationary or moving in accordance with the techniques presented herein.

In order to classify respective objects (such as objects 102) as moving or stationary, and optionally in order to identify other properties such as position and velocity, techniques may be utilized to translate the lidar points 214 of the respective lidar point clouds 210 to three-dimensional space. FIG. 3 presents an illustration of an exemplary scenario 300 featuring a translation of a set of lidar point clouds 210 to classify the objects depicted therein. In this exemplary scenario 300, for respective lidar point clouds 210, the lidar points 214 are mapped 302 to a voxel 306 in a three-dimensional voxel space 304. Next, the voxels 306 of the three-dimensional voxel space 304 may be evaluated to detect one or more voxel clusters of voxels 306 (e.g., voxels 306 that are occupied by one or more lidar points 214 in the lidar point cloud 210, and that share an adjacency with other occupied voxels 306 of the three-dimensional voxel space 304, such as within a specified number of voxels 306 of another occupied voxel 306), resulting in the identification 308 of one or more objects 312 within an object space 310 corresponding to the three-dimensional voxel space 304. Next, for the respective lidar points 214 in the lidar point cloud 210, the lidar point 214 may be associated with a selected object 312. The movement of the lidar points 214 may then be classified according to the selected object 312 (e.g., the objects may be identified as moving or stationary with the object 312 in the three-dimensional voxel space 304). According to the classified movements of the lidar points 214 associated with the object 312 (e.g., added for the object spaces 310 at respective time points 212), a projection 314 of the lidar points 214 and an evaluation of the movements of the lidar points 214 associated with respective objects 312, the movement of the respective objects 312 may be classified. For example, and as depicted in the projection 314 of FIG. 3, the lidar points 214 associated with the first object 312, after projection in view of the three-dimensional voxel space 304, appear to be moving with respect to the lidar detector 208, and may result in a classification 316 of the object 312 as a moving object; while the lidar points 214 associated with the second object 312, after projection in view of the three-dimensional voxel space 304, appear to be stationary after adjusting for the movement of the lidar detector 208, and may result in a classification 316 of the object 312 as a stationary object.

Figure 4:
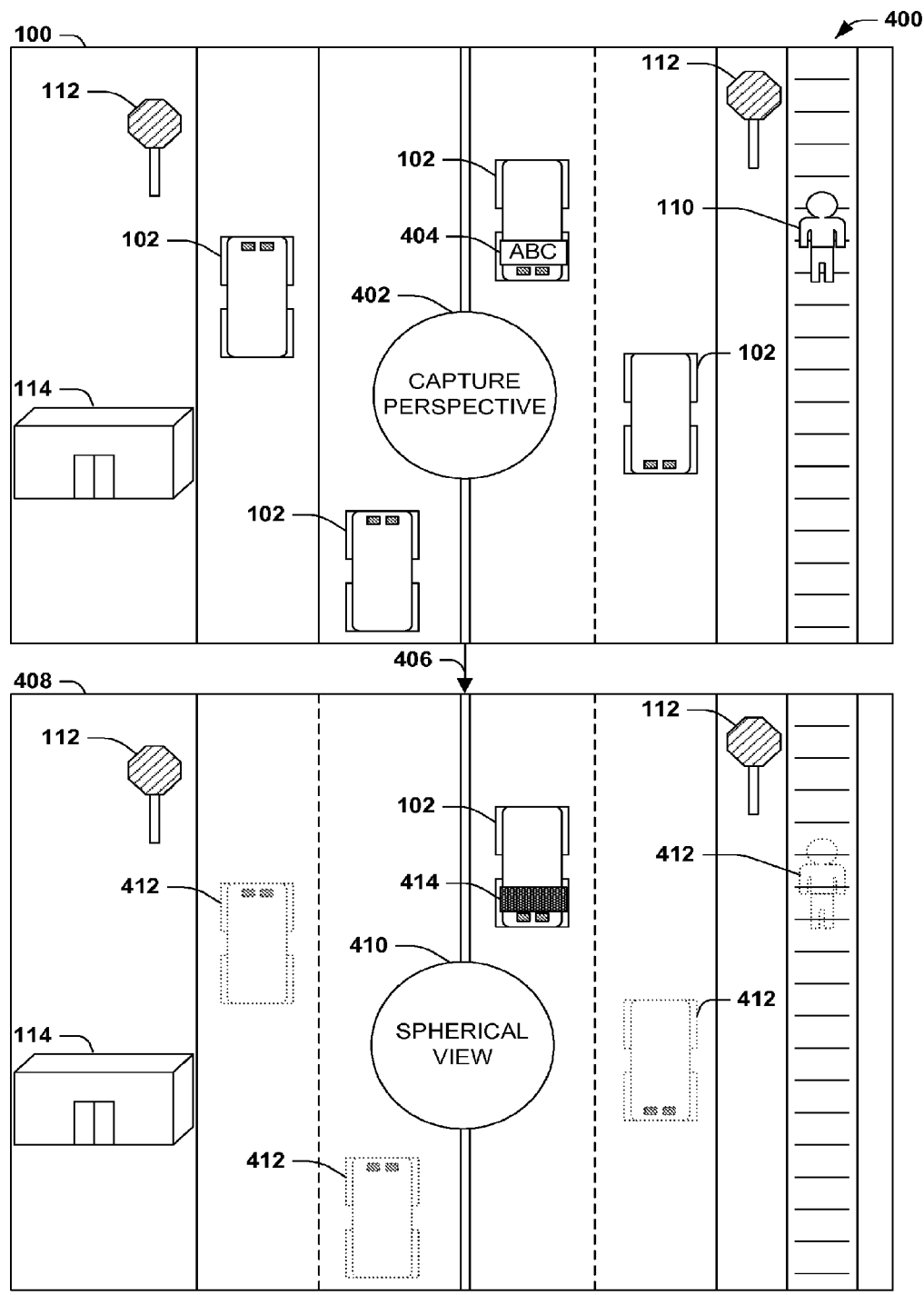
FIG. 4 is an illustration of an exemplary scenario featuring a rendering of an environment with an omission of objects detected by the evaluation of lidar data in accordance with the techniques presented herein.

These and other techniques for evaluating a lidar point cloud 210 to detect and classify a set of objects 102 in an environment 100 may facilitate the process of generating a rendering of the environment 100 omitting such objects 102. FIG. 4 presents an illustration of an exemplary scenario 400 featuring an omission of such objects 102 from a rendering 408 of an environment 100. In this exemplary scenario 400, a representation of the environment 100 is captured from a capture perspective 402 (e.g., a position within the environment 100), which may include both the environment 100 and the objects 102 present therein, including vehicles, individuals 110, signs 112, and buildings 114. Some objects (such as the signs 112 and buildings 114) may be regarded as part of the environment 100 that are to be included in the rendering of the environment 100 (e.g., as fixed-ground objects and background objects), while other objects 102 may be regarded as transients to be removed from the rendering of the environment 100 (e.g., as moving objects and stationary foreground objects). Moreover, some objects 102 may include only an object portion of the object 102 that is to be omitted. For example, rather than omitting an entire individual 110 or vehicle, it may be desirable to omit only an object portion of the object 102 that may be associated with a particular individual 110, such as the individual's face, or a license plate 404 of a vehicle.

In order to generate a rendering 408 of the environment 100 satisfying these considerations, the representation of the environment 100, including the lidar point cloud 210 captured by a lidar detector 208, may be evaluated to identify the objects 102 in the environment 100, and a movement classification 316 of such objects 102. A rendering 408 of the environment 100 assembled from the capturing 406 (e.g., a stitched-together image assembled from a set of panoramic and/or spherical images) may therefore present a spherical view 410 from the capture perspective 402 that omits any portions of the capturing 406 depicting the objects 102 detected within the environment 100 and according to the movement classification 316. For example, the rendering 408 may exclude all objects 102 that are classified to be moving. Objects 102 that are classified as stationary may further be evaluated to distinguish stationary foreground objects (e.g., objects 102 that are within a particular range of the capture perspective 402) from fixed-ground objects (such as signs 112) and/or background objects (such as buildings 114). As a result, the rendering 408 of the environment 100 may contain omitted portions 412, e.g., spots in the rendering 408 that have been blurred, blackened, or replaced with a depiction of the environment 100 that is not obscured by an object 102. Additionally, it may be desirable to omit only an object portion 414 of an object 102, such as the license plate 404 of the vehicle. In this manner, various techniques may be applied to utilize a lidar point cloud 210 (including, as but one example, the evaluation of the lidar point cloud 210 in the exemplary scenario 300 of FIG. 3) in the omission of objects 104 in a rendering 408 of an environment 100 in view of the classification 316 of the objects 312 according to the lidar point cloud 210 in accordance with the techniques presented herein.

C. Exemplary Embodiments

Figure 5:
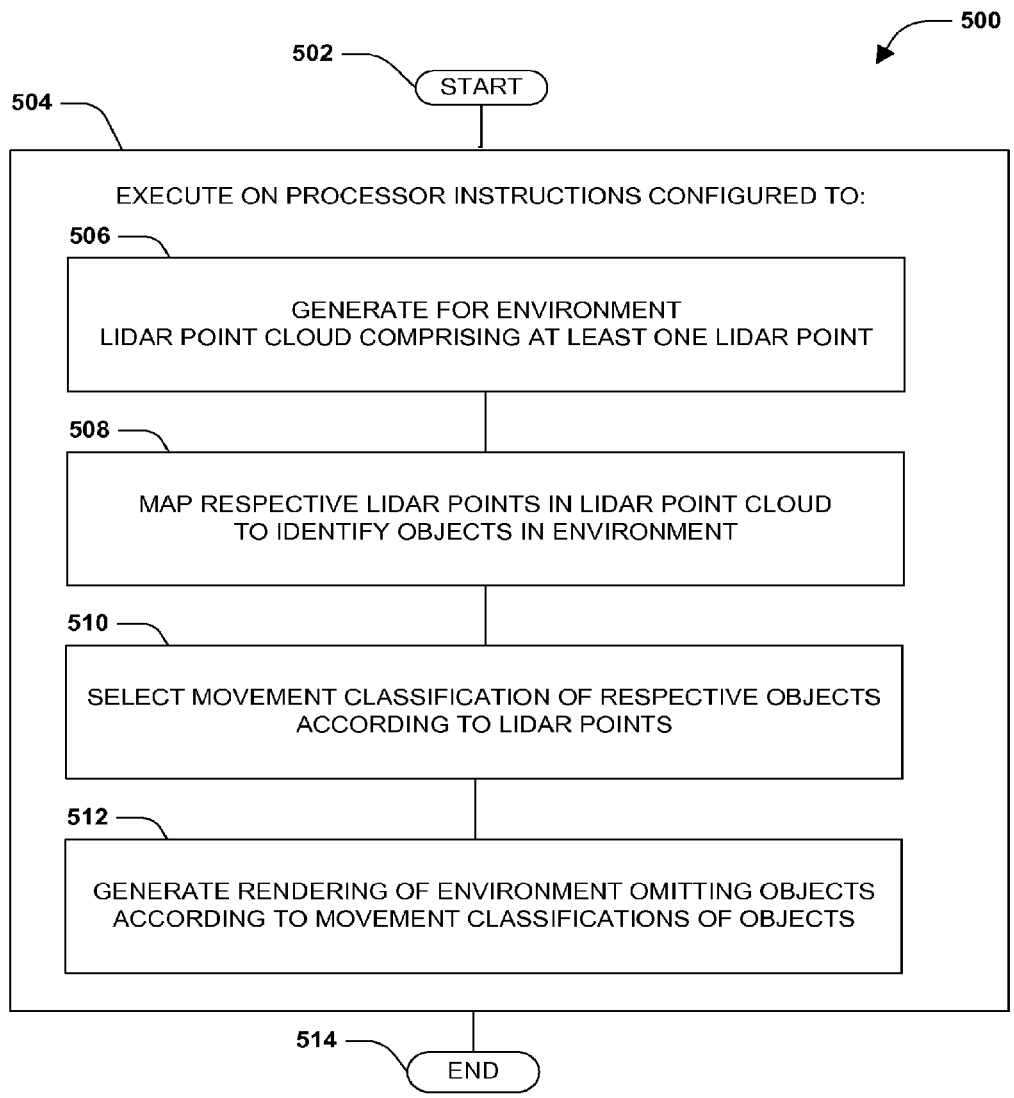
FIG. 5 is a flow diagram of an exemplary method of evaluating a lidar point cloud over time to classify identified objects as stationary or moving in accordance with the techniques presented herein.

FIG. 5 presents a first exemplary embodiment of the techniques presented herein, illustrated as an exemplary method 500 of rendering an environment 100 omitting one or more objects 102. The exemplary method 500 may be implemented, e.g., as a set of instructions stored in a memory device of the device, such as a memory circuit, a platter of a hard disk drive, a solid-state storage device, or a magnetic or optical disc, and organized such that, when executed on a processor of the device, cause the device to operate according to the techniques presented herein. The exemplary method 500 begins at 502 and involves executing 404 the instructions on a processor of the device. Specifically, the instructions are configured to generate 506, for the environment 100, a lidar point cloud 210 comprising at least one lidar point 214. The instructions are also configured to map 508 respective lidar points 214 in the lidar point cloud 210 to identify at least one object 102 in the environment 100. The instructions are also configured to select 510 a movement classification 316 of the respective at least one object 102 according to the lidar points 214. The instructions are also configured to generate 512 the rendering 408 of the environment 100 omitting at least an object portion of the respective at least one object 102 according to the movement classification 316 of the object 102. In this manner, the exemplary method 500 achieves the rendering 408 of the environment 100 omitting at least one object 102 in a manner that is facilitated by lidar data in accordance with the techniques presented herein, and so ends at 514.

Figure 6:
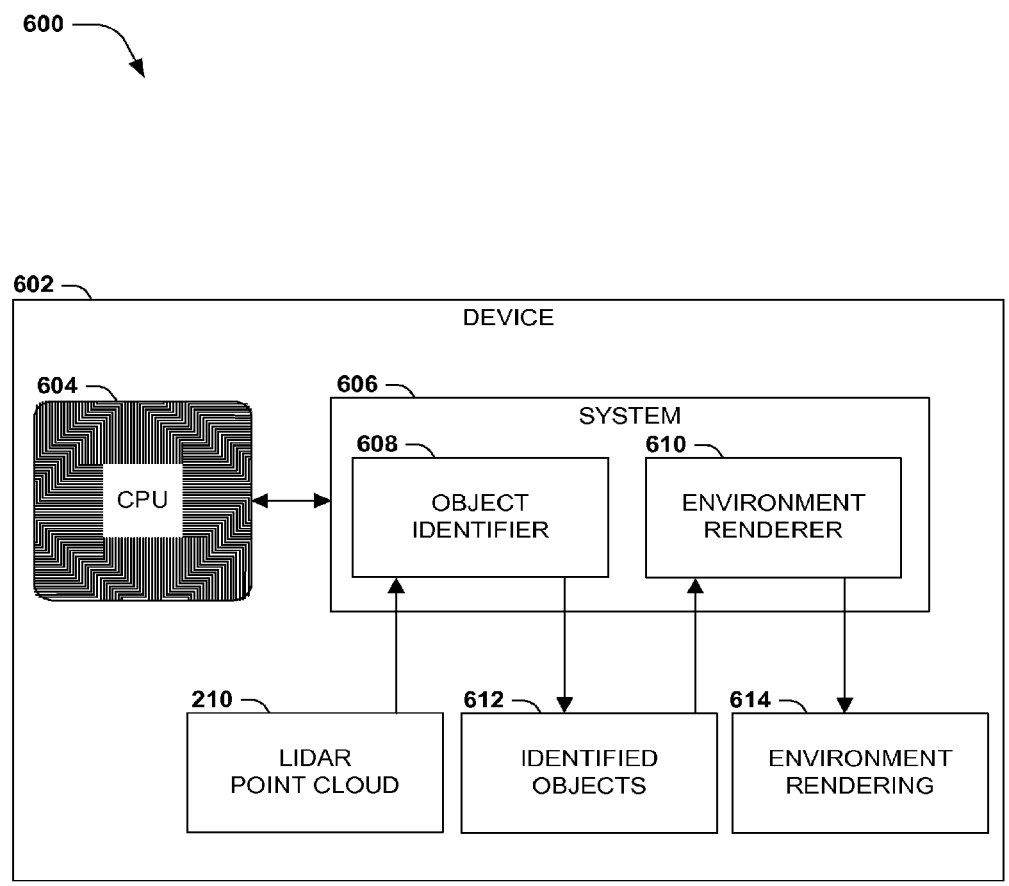
FIG. 6 is a component block diagram of an exemplary system configured to evaluate a lidar point cloud over time to classify identified objects as stationary or moving in accordance with the techniques presented herein.

FIG. 6 presents a second exemplary embodiment of the techniques presented herein, illustrated as an exemplary system 606 configured to render an environment 100 omitting at least one object 102 of the environment 100. The exemplary system 606 may be implemented, e.g., as instructions stored in a memory component of the device 602 and configured to, when executed on a processor 604 of the device 602, cause the device 602 to operate according to the techniques presented herein. The exemplary system 606 includes an object identifier 608 that is configured to generate, for the environment 100, a lidar point cloud 210 comprising at least one lidar point 214; map the respective lidar points 214 in the lidar point cloud 210 to identify at least one object 102 in the environment 100; and select a movement classification 316 of the respective at least one object 102 according to the lidar points 214, thereby outputting a set of identified objects 612. The exemplary system 606 also includes an environment renderer 610, which is configured to generate the rendering 408 of the environment 100 omitting at least an object portion of the respective at least one object 102 based on the set of identified objects 612 and the movement classification 316 of the objects 102, thus producing an environment rendering 614 of the environment 100 omitting one or more objects 102 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
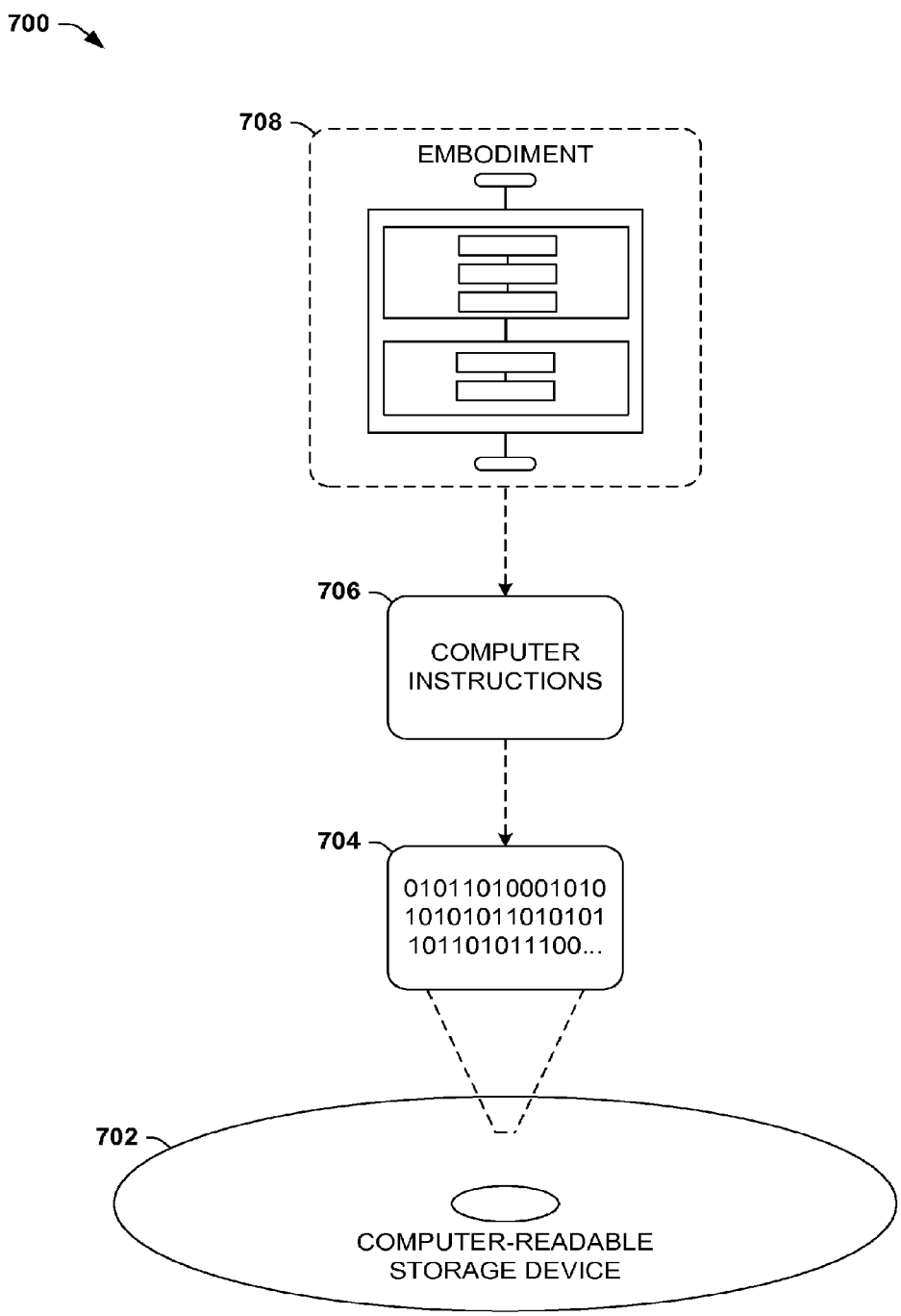
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 700 comprises a computer-readable storage device 702 (e.g., a CD-R, DVD-R, or a platter of a hard disk drive), on which is encoded computer-readable data 704. This computer-readable data 704 in turn comprises a set of computer instructions 706 configured to operate according to the principles set forth herein. In one such embodiment, the processor-executable instructions 706 may be configured to perform a method 708 of rendering an environment 100 omitting a set of objects 102, such as the exemplary method 500 of FIG. 5. In another such embodiment, the processor-executable instructions 706 may be configured to implement a system for rendering an environment 100 omitting a set of objects 102, such as the exemplary system 606 of FIG. 6. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 500 of FIG. 5 and the exemplary system 606 of FIG. 6) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized to evaluate many types of objects, including objects 102 traveling in an environment 100, such as automobiles and bicycles traveling on a roadway or airplanes traveling in an airspace, and individuals moving in an area, such as a motion-capture environment 100.

As a second variation of this first aspect, the techniques presented herein may be utilized with many types of lidar signals 204, including visible, near-infrared, or infrared, near-ultraviolet, or ultraviolet light. Various wavelengths of lidar signals 204 may present various properties that may be advantageous in different scenarios, such as passage through various media (e.g., water or air of varying humidity), sensitivity to various forms of interference, and achievable resolution.

As a third variation of this first aspect, the techniques presented herein may be utilized with various types of lidar emitters 202 and/or lidar detectors 208, such as various types of lasers and photometric detectors. Additionally, such equipment may be utilized in the performance of other techniques (e.g., lidar equipment provided for range detection in vehicle navigation systems may also be suitable for the classification of moving and stationary objects), and may be applied to both sets of techniques concurrently or in sequence. Those of ordinary skill in the art may devise a broad variety of such scenarios for the identification and movement classification 316 of objects 312 according to the techniques presented herein.

D2. Object Identification and Classification

A second aspect that may vary among embodiments of these techniques relates to the manner of evaluating the lidar point cloud 210 to identify the objects 102 and the movement classification 316 thereof.

As a first variation of this second aspect, the particular techniques illustrated in the exemplary scenarios of FIG. 2-3 may be utilized to evaluate the lidar point cloud 210 and to detect and classify objects 102 associated with respective lidar points 214. However, it may be appreciated that these exemplary scenarios present only one such technique for evaluating a lidar point cloud 210, and that other evaluative techniques may be utilized that add to, remove from, and/or alter these techniques. As a first example, the mapping of lidar points 214 to objects 102 may involve a mapping 302 to a three-dimensional voxel space 304, as illustrated in the exemplary scenario 300 of FIG. 3. Alternatively, such mapping may include a two-dimensional mapping to two-dimensional voxels 306 (e.g., a two-dimensional grid representing an aerial view of the environment 100), or a proximity calculation that identifies clusters of proximate lidar points 214 that appear to move together in the environment 100 over time. As a second such example, identifying the movement classification 316 of the objects 102 may be based on the movement classification of the individual lidar points 214 associated with the object 102, such as in the exemplary scenario 300 of FIG. 3, or may involve calculating an average movement of the lidar points 214 associated with the object 102, and/or may involve identifying regions of the three-dimensional voxel space 304 having lidar points 214 that appear to be moving in a comparatively similar direction.

As a second variation of this second aspect, the identification and/or movement classification 316 of objects 102 may be achieved by algorithms devised and encoded by humans. Alternatively or additionally, such identification may be achieved in whole or in part by a machine-learning technique. For example, a device 602 may comprise a movement classifier that is trained and configured to select a movement classification 316 of an object 102 in an environment 100 using the lidar point cloud 210, such as an artificial neural network or a genetically evolved algorithm. The techniques presented herein may involve selecting the movement classification 316 of the respective objects 102 by invoking the movement classifier.

As a third variation of this second aspect, many techniques may be used to facilitate the identification of objects 102 in the environment 100 along with the evaluation the lidar point cloud 210. As a first such example, a device 602 may have access to at least one image of the environment 100, and the detection of the objects 102, movement classification 316 of the objects 102, and/or the rendering of the environment by focusing an image portion of the image depicting the object 102 using the movement classification 316 of the object 102. For example, the precise information about the position, orientation, shape, shape, and/or velocity of the object 102 in the environment 100 may enable the identification of a specific portion of the image that is associated with the area of the lidar points 214 associated with the object 102, and thus likely depicting the object 102 in the environment. Such focusing may involve, e.g., trimming the portion of the image to the boundaries of the object 102 matching the lidar points 214, and/or selecting a focal distance of the image to sharpen the selected portion of the image. As a further variation, the image may be focused on at least one selected object portion of an object 102, such as an object portion of the object 102 that may be personally identifying of an individual 110, such as a face of an individual 110 or a license plate of a vehicle. As one such example, evaluating the lidar point cloud 210 may enable a determination of the orientation of the object 102 and a determination of the position of the object portion of the object 102 (e.g., detecting the orientation of a vehicle may enable a deduction of the location of the license plate on the vehicle, such as a particular flat rectangle on a bumper of the vehicle, and/or an area at a certain height above ground level). Alternatively or additionally, the evaluation of the lidar point cloud 210 may enable a focusing of an image portion of the image that depicts the selected object portion of the object 102 using the movement classification 316 of the object 102. This type of focusing may enable, e.g., the generation of a rendering 408 of the environment 100 omitting the image portion depicting the selected object portion of the object 102.

As a fourth variation of this second aspect, in some scenarios, at least one object 102 in the environment 100 may be visually associated with at least one character, such as recognizable letters, numbers, symbols, and/or pictograms. In such scenarios, the identification of objects 102 and/or object portions in respective images may involve the recognition of characters through an optical character recognizer. For example, identifying the object 102 in the environment 100 may further involve applying an optical character recognizer to one or more images of the environment 100 to detect the at least one character, and associating the character with the object 102 in the environment 100. This variation may be advantageous, e.g., for automatically detecting symbols on a personally identifying license plate of a vehicle, and may be used in conjunction with the evaluation of the lidar point cloud 210.

As a fifth variation of this second aspect, the evaluation of the objects 102 may include many types of movement classification 316. For example, respective objects 102 may be classified as having a movement classification 316 selected from a movement classification set comprising a moving object, a stationary foreground object, a stationary background object, and a fixed-ground object. These movement classifications 316 may facilitate determinations in which objects 102 to omit from the rendering 408 of the environment 100; e.g., moving objects and stationary foreground objects may be presumed to be transient with respect to the environment 100 and may be omitted, while stationary background objects and fixed-ground objects may be presumed to be integral to the environment 100 and may not be omitted.

Figure 8:
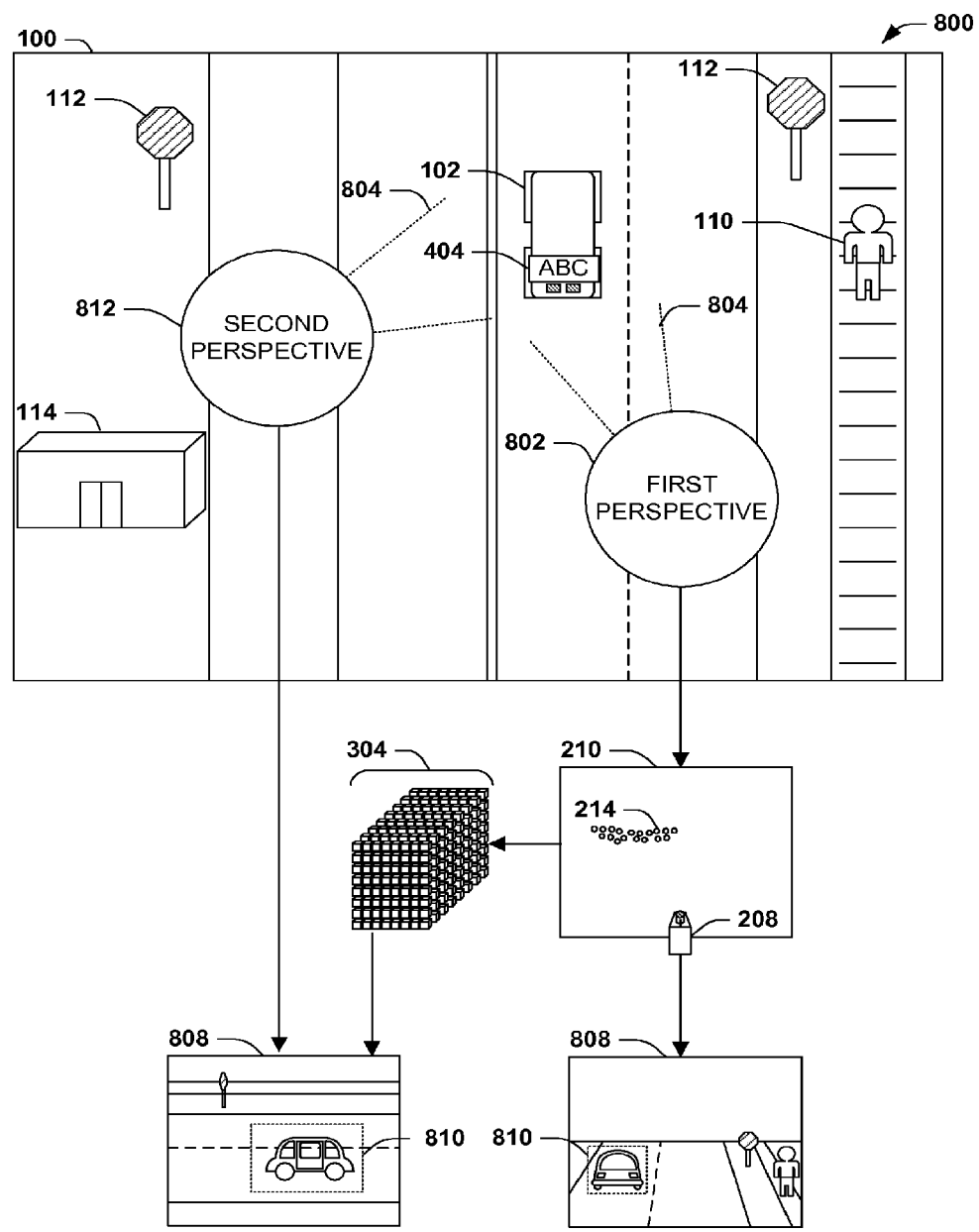
FIG. 8 is an illustration of an exemplary scenario featuring an evaluation of images of an environment captured from different perspectives utilizing an evaluation of lidar data.

As a sixth variation of this second aspect, the identification of objects 102 in a first capturing 406 of the environment 100 using the lidar point cloud 210 may facilitate the identification of objects 102 in a second capturing 406 of the environment 100. FIG. 8 presents a first exemplary scenario 800 featuring one such facilitated identification of objects 102. In this first exemplary scenario 800, an environment 100 is captured from a first perspective 802 having a first viewing angle 804, and may include an object 102 such as a vehicle. When the object 102 has been recognized in the capturing 406 from the first perspective 802 according to the lidar points 214 of the lidar point cloud 210, a representation portion 810 of a first environment representation 808 of the environment 100 from the first perspective 802 (e.g., captured concurrently with the detection of the lidar point cloud 210 by the lidar detector 208) may be identified as depicting the object 102. Additionally, this identification may facilitate an identification of the object 102 in while evaluating a second environment representation 808 captured from a second perspective 812 form a different viewing angle 804. For example, a device 602 may, upon identifying the object 102 in the environment 100 from a first environment representation 808, identify a position of the object 102 in the environment 100 according to the first perspective (e.g., determining the location of the first perspective 802 with respect to the environment 100, determining the relative position of the object 102 with respect to the lidar detector 208, and deducing the position of the object 102 with respect to the environment 100. As one such example, the position of the object 102 with respect to the environment 100 may be determined as the location of the voxel cluster of the object 102 in the three-dimensional voxel space 304. Conversely, the second viewing angle 804 of the second perspective 812 may be mapped to a particular section of the three-dimensional voxel space 304, and areas of the three-dimensional voxel space 304 (including the voxel cluster of the object 102) may be mapped to portions of the second image captured from the second perspective 812. In this manner, even before evaluating the second image, it may be possible for the device 602 to determine where in the second image the object 102 is likely to appear. Such variations may be utilized, e.g., to guide the identification process (e.g., focusing the evaluation of the second environment representation 808 on a selected portion); to inform and/or verify an image evaluation process; or even to select the environment representation portion 810 of the environment representation 808 without applying any image evaluation techniques.

Figure 9:
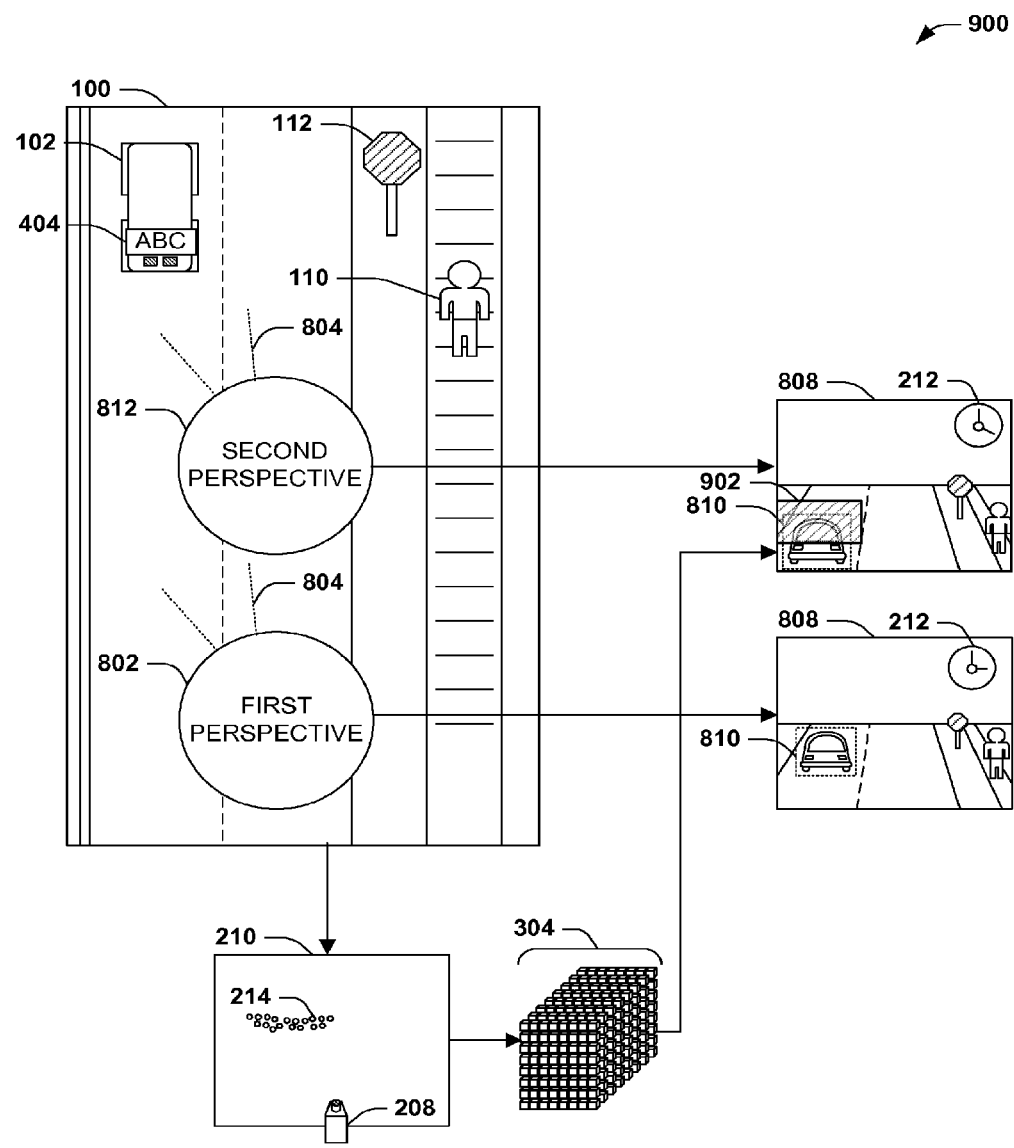
FIG. 9 is an illustration of an exemplary scenario featuring an evaluation of a sequence of images of an environment captured in a time sequence and utilizing an evaluation of lidar data.

FIG. 9 presents an illustration of an exemplary scenario 900 featuring a second application of such variations that may reduce false positives and false negatives in the identification and/or omission of objects 102. In this exemplary scenario 900, an environment 100 is captured from a first perspective 802 and a second perspective 812 at different time points 212. However, at the second time point 212, an environment representation 808 of the environment 100 may be distorted, e.g., by a shadow 902 altering the depiction of the object 102. However, if the environment representations 808 present an environment representation sequence (e.g., a sequence of images captured at consistent intervals), the identification of an environment representation portion 810 of a first object representation 808 from the first perspective 802 may facilitate the accurate evaluation of the second environment representation 808 and the omission of the object 102, as it is adjacent in the environment representation sequence (e.g., a next or preceding image that varies only by a small time interval) to the first environment representation 808 where the object 102 has been identified. For example, upon identifying an object 102 in the environment 100 from a first environment representation 808 of the environment representation sequence, the device may examine a second environment representation 808 that is adjacent to the first environment representation 808 in the environment representation sequence to identify the object 102 in the second environment representation 808 (e.g., using the same environment representation portion 810 in each environment representation 808, and/or offsetting the environment representation portion 810 based on a movement vector 104 of the object 102 and/or a perspective delta from the first perspective 802 to the second perspective 812, and the time interval). That is, if a first position of the object 102 detected in the first environment representation 808 may be identified and projected to estimating a second position in the second environment representation 808, then the device 602 may initiate and/or focus an examination of the second environment representation 808 based on the second position and the correlated environment representation portion 810 of the second environment representation 808. In this manner, the detection of an object 102 in one capturing 406 of the environment 100 may inform the detection of the same object 102 in other capturings 406 of the environment 100 varying in time and/or space, thereby facilitating the efficiency and/or accuracy of the object detection. Many such evaluative techniques may facilitate the identification and movement classification 316 of the objects 102 in the environment 100 in accordance with the techniques presented herein.

D3. Uses of Object Identification and Movement Classification

A third aspect that may vary among embodiments of these techniques involves the uses of the object identification and movement classification 316 in accordance with the techniques presented herein.

As a first variation of this third aspect, the omission of the objects 102 may be in furtherance of various scenarios. As a first such example, the omission of the objects 102 from the rendering 408 of the environment 100 may be performed, e.g., to preserve the privacy of the individuals 110. As a second such example, the omission of the objects 102 may be performed to obscure the identity of the environment 100 (e.g., removing any object 102 may be distinctively identify the environment 100, as compared with any other environment 100 of similar appearance). As a third such example, the omission of the objects 102 may be performed to provide a rendering 408 of the environment 100 that is not obscured by the objects 102 (e.g., generating an "empty" environment 100 as if the objects 102 had not been present), which may be achievable by substituting an image portion of an image capturing 406 of the environment 100 with a second portion of the environment 100 that corresponds to the same view, but that is not obscured. As a fourth such example, the omission of the objects 102 may enable the insertion of other objects 102, or even of the same objects 102 at different time points; e.g., animation of the objects 102 moving through the rendering 408 of the static environment, as a modeled or computer-generated depiction of such motion, may be more desirable than rendering 408 the environment 100 to include the motion of the object 102 captured during the capturing 406.

As a second variation of this third aspect, the omission of the objects 102 from the rendering 408 of the environment 100 may be achieved in various ways. As a first such example, for scenarios involving a capturing 406 of at least one image of the environment 100, the objects 102 may be omitted by blurring at least an image portion of at least one image depicting the at least an object portion of the at least one object 102. Alternatively or additionally, the omission may be achieved by blackening or whitening the image portion, or substituting another image portion for the object portion (e.g., pasting an image of a second object 102 over the depiction of the first object 102 in the environment 100). As another such example, if the object 102 comprises an individual 110, and the capturing 406 includes at least one personal identifier (such as a recognizable feature of the individual 110), the device 602 may remove at least one of the recognizable features of the individual 110 from the rendering 408 of the environment 100. As another example, if the object 102 comprises a vehicle that is associated with an individual 110, and if the capturing 406 of the environment 100 includes a personal identifier comprising a vehicle identifier attached to the vehicle, the device 602 may remove the vehicle identifier of the vehicle from the rendering 408 of the environment 100. As yet another example, the device 602 may have access to at least one background portion of the rendering 408 of the environment 100 corresponding to a representation portion of the capturing 406 that has been obscured by an object 102 (e.g., a second image of the environment 100 from the same capture perspective 402 that is not obscured by the object 102), and a device 602 may replace the obscured portion of the capturing 406 with the background portion while generating the rendering 408 of the environment 100.

As a third variation of this third aspect, a device 602 may, in addition to omitting the object 102 from the rendering 408 of the environment 100, apply the information extracted from the evaluation of the lidar point cloud 210 to achieve other features. As a first such example, a device 602 may, upon receiving a request to generate a second rendering 408 of the environment 100 that includes the objects 102, insert the objects 102 into the rendering 408 of the environment 100 to generate the second rendering 408. That is, having removed the objects 102 from the rendering 408 of the environment 100, the device 602 may fulfill a request to reinsert the objects 102, e.g., as a differential depiction of a populated vs. empty environment 100. The insertion may also present different depictions of the objects 102 than the portions of the capturing 406 removed from the rendering 408, such as stylized, iconified, and/or clarified depictions of the objects 102. As a second such example, a device 602 may, for respective objects 102 that are moving in the environment 100 according to the movement classification 316, estimate a movement vector 104 of the object 102 at one or more time points 212. Additionally, the device 602 may generate within the rendering 408 a depiction of the object 102 moving through the environment 100. For example, having extracted a static, empty representation of the environment 100, insert an animation of the moving objects 102 to depict action within the environment 100 over time. As a third such example, the information may be used to select an object type of the respective objects 102 (e.g., the evaluation of the lidar point cloud 210 may inform and facilitate an object recognition technique). These and other uses of the information generated by the evaluation of the lidar point cloud 210 may be devised and applied to a variety of scenarios by those of ordinary skill in the art in accordance with the techniques presented herein.

E. Computing Environment

Figure 10:
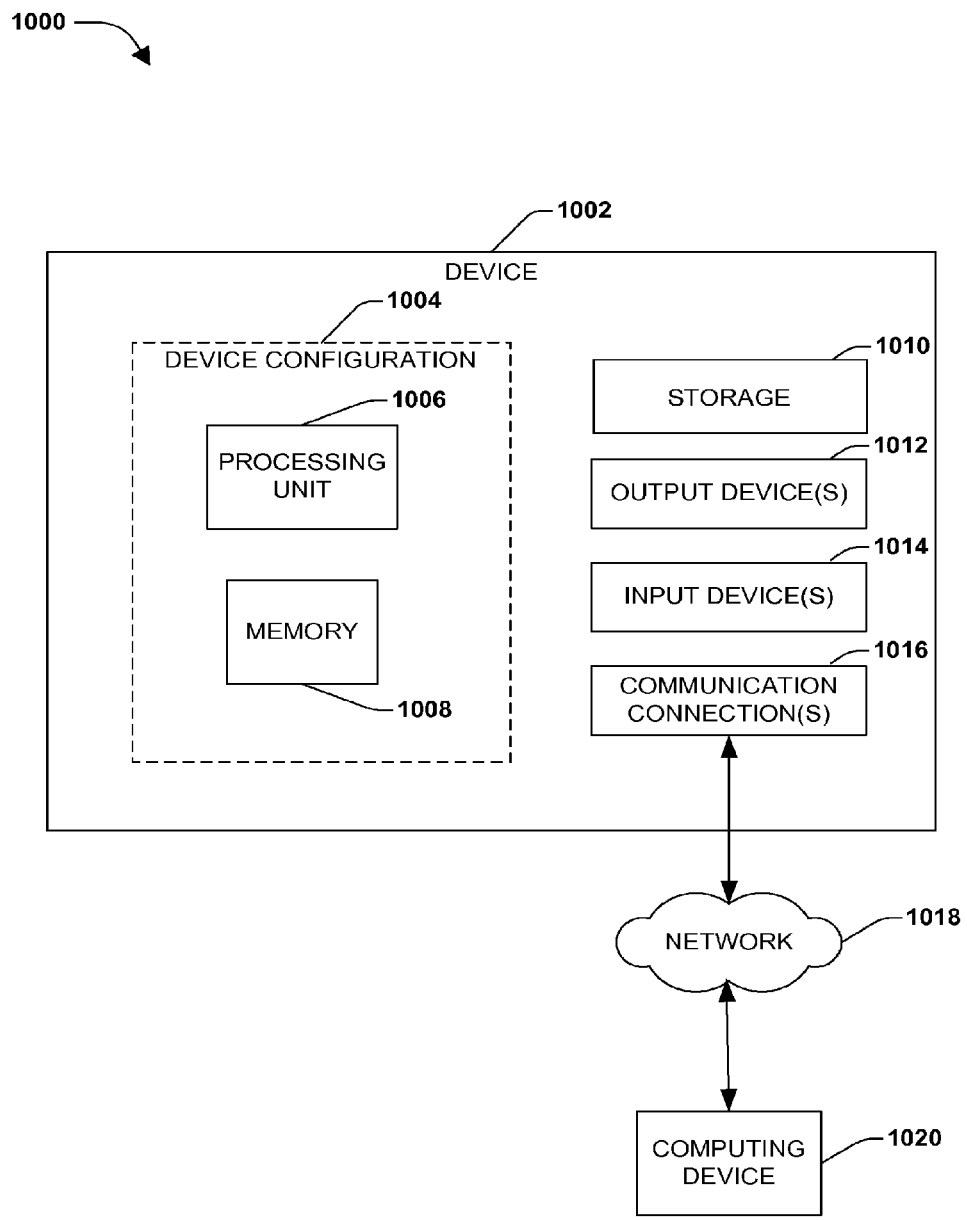
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating a rendering of an environment including at least one object, the method performed on at least one device comprising at least one processor and the method comprising:
   generating for the environment a lidar point cloud comprising at least one lidar point;
   based on lidar points in the lidar point cloud, identifying at least one object in a first representation of the environment;
   based on an identified position of the object in the first representation, estimating a position of the object in a second representation of the environment;
   based on the estimated position, identifying the object in a second representation of the environment; and
   generating the rendering of the environment omitting at least a portion of the object based on the identification of the object in the second representation.

2. The method of claim 1, further comprising:
   selecting a movement classification of an object in the environment using the lidar point cloud.

3. The method of claim 1, wherein
   generating the rendering of the environment comprises:
   focusing a portion of an image depicting the object using a movement classification of the object; and
   generating the rendering of the environment omitting the portion of the image depicting the object.

4. The method of claim 3, wherein
   generating the rendering of the environment comprises:
   focusing an image portion of the image depicting a selected object portion of the object using a movement classification of the object; and
   generating the rendering of the environment omitting the image portion depicting the selected object portion of the object.

5. The method of claim 1, wherein
   identifying the at least one object in the first representation of the environment further comprises:
   applying an optical character recognizer to the first representation of the environment to detect at least one character; and
   associating the at least one character with the object in the environment.

6. The method of claim 1, further comprising selecting the movement classification for the object, wherein the movement classification is selected from a movement classification set comprising:
   a moving object;
   a stationary foreground object;
   a stationary background object; and
   a fixed-ground object.

7. The method of claim 1
   further comprising:
   capturing at least one image of the environment; and
   omitting the at least an object portion of the respective at least one object comprising: blurring at least an image portion of at least one image depicting the at least one object portion of the at least one object.

8. The method of claim 1, wherein:
   at least one selected object comprises a personal identifier of at least one individual associated with the object; and
   omitting the at least an object portion of the selected object comprises removing from the rendering of the environment the at least one personal identifier of the at least one individual.

9. The method of claim 8 wherein:
   the object comprises an individual;
   the personal identifier comprises at least one recognizable feature of the individual; and
   omitting the at least an object portion of the selected object further comprises removing the at least one recognizable feature of the individual from the rendering of the environment.

10. A system comprising:
    at least one processor; and
    a memory operatively coupled to the at least one processor, the memory storing instructions that when executed by the at least one processor perform a set of operations comprising:
    generating, for an environment, a lidar point cloud comprising at least one lidar point;
    based on lidar points in the lidar point cloud, identifying at least one object in a first representation of the environment;
    based on an identified position of the object in the first representation, estimating a position of the object in a second representation of the environment;
    based on the estimated position, identifying the object in a second representation of the environment; and
    generating the rendering of the environment omitting at least a portion of the object based on the identification of the object in the second representation.

11. The system of claim 10, wherein generating the rendering of the environment further comprises, for least one background portion of the rendering of the environment that is obscured by a selected object, replacing at least one object portion of at least one object depicted in the environment with a background portion of the environment.

12. The system of claim 10, wherein the operations further comprise, for object that is moving in the environment according to a movement classification, generate within the rendering a depiction of the object moving through the environment.

13. The system of claim 10, wherein the operations further comprise estimating a movement vector of the object, and wherein estimating the position of the object in the second representation of the environment is further based on the movement vector of the object.

14. The system of claim 10, wherein the operations further comprise identifying an object type for the object.

15. The system of claim 10, wherein the object is one a vehicle or an individual.

16. A computer-readable storage device comprising instructions that, when executed on a processor of a device, cause the device to generate a rendering of an environment including at least one object by:
    based on lidar points in a lidar point cloud representing the environment, identifying at least one object in a first representation of the environment;
    based on an identified position of the object in the first representation, estimating a position of the object in a second representation of the environment;

based on the estimated position, identifying the object in a second representation of the environment; and
generating the rendering of the environment omitting at least a portion of the object based on the identification of the object in the second representation.

17. The computer-readable storage device of claim 16, wherein estimating the position of the object in the second representation of the environment is further based on a movement classification for the object.

18. The computer-readable storage device of claim 17, wherein the movement classification is one of:
a moving object;
a stationary foreground object;
a stationary background object; and
a fixed-ground object.

19. The computer-readable storage device of claim 16, wherein estimating the position of the object in the second representation of the environment is further based on a movement vector.

20. The computer-readable storage device of claim 16, wherein the object is one a vehicle or an individual.

\* \* \* \* \*